(12) United States Patent  
Zakuskin (10) Patent No.: US 8,967,736 B2  
(45) Date of Patent: Mar. 3, 2015

(54) ROTATABLE TRACK DRIVE

(75) Inventor: Yuriy Zakuskin, Orekhov (UA)

(73) Assignee: OAK Novations, Ltd., Middlesex, NJ (US)

( * ) Notice: Subject to any disclaimer, the term of this patent is extended or adjusted under 35 U.S.C. 154(b) by 527 days.

(21) Appl. No.: 13/358,006

(22) Filed: Jan. 25, 2012

(65) Prior Publication Data

US 2013/0187443 A1 Jul. 25, 2013

(51) Int. Cl.
*B62D 55/04* (2006.01)

(52) U.S. Cl.
USPC .......... 305/132; 475/182; 475/343; 180/65.6; 180/65.7

(58) Field of Classification Search
CPC ........ B62D 55/04; B62D 55/14; B62D 55/24; B62D 55/30
USPC ......... 305/124, 126, 127, 130, 132, 133, 143, 305/153, 154, 155; 301/6.5; 180/65.6, 65.7, 180/65.51, 9.21, 9.26, 9.62; 475/331, 343, 475/344, 346, 182, 185, 186, 195
See application file for complete search history.

(56) References Cited

U.S. PATENT DOCUMENTS

| | | | | | |
|---|---|---|---|---|---|
| 1,101,212 | A | * | 6/1914 | Merritt | 36/78 |
| 3,283,839 | A | * | 11/1966 | Brown et al. | 180/8.2 |
| 4,078,452 | A | * | 3/1978 | Rosler | 475/83 |
| 4,191,073 | A | * | 3/1980 | Ritter, Jr. | 475/337 |
| 4,299,072 | A | * | 11/1981 | Holstein | 53/306 |
| 4,988,329 | A | * | 1/1991 | Lammers | 475/337 |
| 6,176,334 | B1 | * | 1/2001 | Lorenzen | 180/9.48 |
| 2007/0119663 | A1 | * | 5/2007 | Ha | 188/68 |
| 2008/0093134 | A1 | * | 4/2008 | Frawley | 180/65.1 |

* cited by examiner

*Primary Examiner* — Kip T Kotter
*Assistant Examiner* — Jean Charleston
(74) *Attorney, Agent, or Firm* — Cygnet IP Law, P.A.; Stephen W. Aycock II (57) ABSTRACT

A track drive includes a primary driven gear configured to attach to a vehicle hub plate and an annular gear having gear teeth on in inner circumference and an outer circumference. The track drive can also include a plurality of intermediate gears disposed between the primary driven gear and the inner circumference of the annular gear, and a plurality of track drive wheels having an integrated gear configured to mate with gear teeth on the outer circumference of the annular gear. The track drive can further include a continuous track configured to be driven by the plurality of track drive wheels.

20 Claims, 8 Drawing Sheets

ROTATABLE TRACK DRIVE

Embodiments relate generally to track drives for vehicles, and, more particularly to a rotatable track drive.

Track drives can be effective when operating a vehicle (e.g., a car, truck, an all terrain vehicle (ATV), motorcycle or the like) on snow, ice, mud, dirt or other surface that can present a challenge to vehicle operation with tires. However, conventional track drives are typically fixed in one position relative to the vehicle axle. To enable conventional track drives to overcome obstacles, the front portion of the track drive may be angled.

Conventional track drives with angled fronts may suffer from one or more limitations. Because the track drives have a designated front, each track must be used only on one side of the vehicle. Also, even though the angled front may make it easier for the track drive to overcome obstacles, conventional track drives may still be limited in an ability to overcome large obstacles.

One or more embodiments were conceived in light of the above-mentioned limitations or problems, among other things.

An embodiment can include a track drive apparatus that is configured in a generally triangular shape and which is adapted to be rotatable about the drive axis.

An embodiment can include a track drive having a primary driven gear configured to attach to a vehicle hub plate and an annular gear having gear teeth on an inner circumference and an outer circumference. The track drive can also include a plurality of intermediate gears disposed between the primary driven gear and the inner circumference of the annular gear, and a plurality of track drive wheels having an integrated gear configured to mate with gear teeth on the outer circumference of the annular gear. The track drive can further include a continuous track configured to be driven by the plurality of track drive wheels.

An embodiment can include a track drive vehicle having a plurality of removable track drives. Each track drive can include a primary driven gear configured to attach to a vehicle hub plate and an annular gear having gear teeth on in inner circumference and an outer circumference. The track drives can also include a plurality of intermediate gears disposed between the primary driven gear and the inner circumference of the annular gear, and a plurality of track drive wheel assemblies, each having a first portion, a second portion and an integrated gear configured to mate with gear teeth on the outer circumference of the annular gear, the first portion and the second portion having beveled edges configured to form a substantially V-shaped drive section. Each track drive can further include a continuous track configured to be driven by the plurality of track drive wheels, the continuous track can have a generally V-shaped inner surface configured to mate with the generally V-shaped drive wheels.

Another embodiment can include a removable track drive apparatus having a primary driven gear configured to attach to a vehicle hub plate, and an annular gear having gear teeth on in inner circumference and an outer circumference. The track drive apparatus can also include a triangular frame, and three intermediate gears disposed between the primary driven gear and the inner circumference of the annular gear and being connected to the frame. The track drive apparatus can also include three track drive wheel assemblies, each having a first portion, a second portion and an integrated gear configured to mate with gear teeth on the outer circumference of the annular gear, the first portion and the second portion having beveled edges configured to form a substantially V-shaped drive section, the track drive wheel assemblies being connected to the frame. The track drive apparatus can include a continuous track configured to be driven by the track drive wheels, the continuous track can have a generally V-shaped inner surface configured to mate with the generally V-shaped drive wheels.

In any of the above-mentioned embodiments, the first portion and the second portion of each drive wheel can be adjusted closer together so as to tighten the continuous track.

DETAILED DESCRIPTION

In general, an embodiment can include a removable track drive that is driven by the axles of a vehicle. The track drive attaches to the wheel hub face plate where a conventional wheel would attach. Alternatively, the track drive units can be used on a motorcycle, scooter or an all terrain vehicle (e.g., three-wheeler, four-wheeler or the like) and can be used in place of a wheel on those vehicles. One track drive unit can be attached to a vehicle in place of each wheel/tire combination. A vehicle can have all wheels replaced by track drive units, or can have some wheels replaced with track drive units. The track drives can give the vehicle better performance in off road conditions and can also give the vehicle better ground clearance for navigating over obstacles.

The track drives described herein are configured to both power the track tread via axle rotation and to also be able to rotate with the axle. In other words, when the track drive units of the present disclosure encounter a sufficiently large obstacle, the track drive unit as a whole may rotate about the drive axle axis and contact the obstacle on a different surface. This ability to rotate about the drive axis can offer an improved ability to overcome obstacles.

Figure 1:
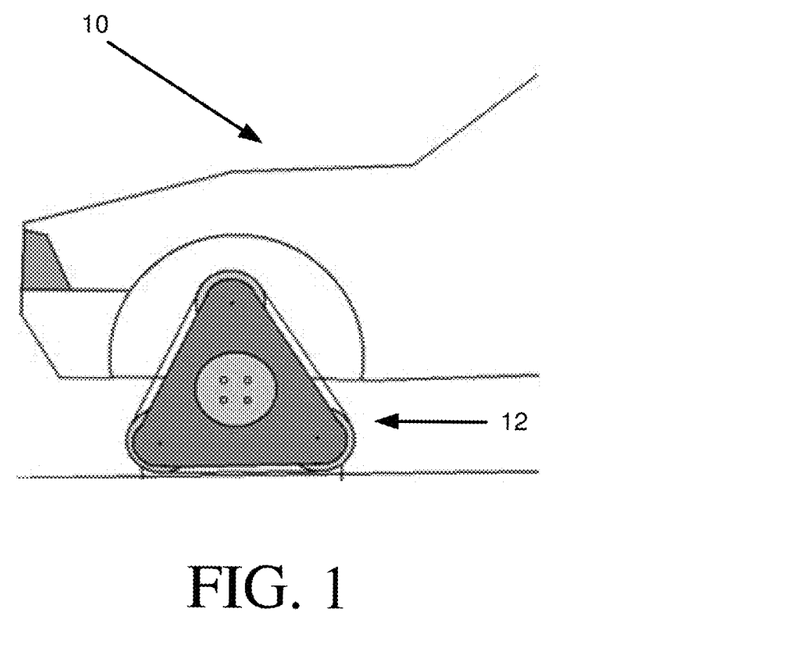
FIG. 1 is a diagram of a vehicle equipped with an exemplary track drive in accordance with at least one embodiment.

FIG. 1 shows a vehicle 10 equipped with an exemplary track drive unit 12. The track drive unit 12 is shown attached to the front axle of the vehicle 10. It will be appreciated that while a car is shown in the figures for illustration purposes, the track drive units can be used with other types of vehicles such as trucks, motorcycles, all terrain vehicles, earth moving equipment, construction equipment, commercial vehicles, military vehicles, terrestrial vehicles, underwater vehicles, space exploration vehicles, or the like.

The track drives can be used in place of front wheels, rear wheels or both. Also, it will be appreciated that the track drive units can be sized and built according to a contemplated use.

Figure 2:
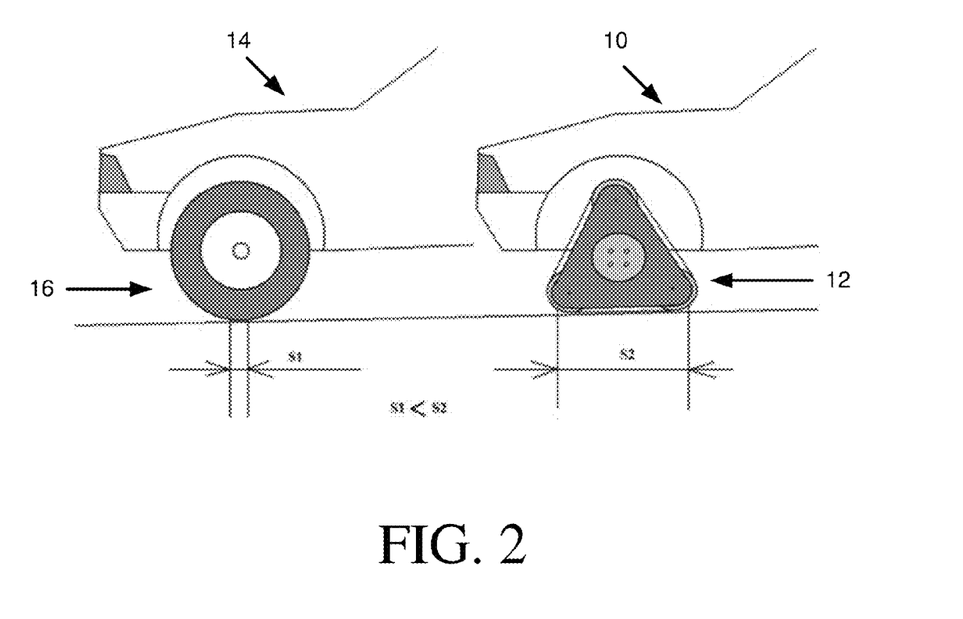
FIG. 2 is a diagram showing differences between a vehicle with a tire and a vehicle equipped with an exemplary track drive in accordance with at least one embodiment.

In operation, as the axles of the vehicle 10 turn, the track coupled to each axle moves as described below. As shown in FIG. 2, the track drive unit 12 provides a greater contact area (S2) with the driving surface than the contact area (S1) of a conventional vehicle 14 with a conventional tire 16.

Figure 3:
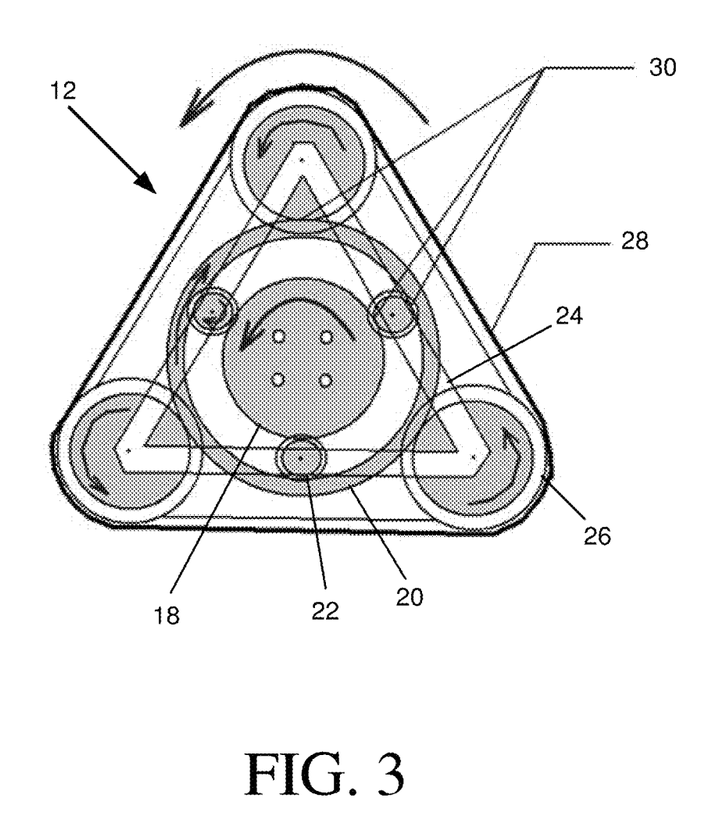
FIG. 3 is a diagram of an exemplary track drive motion in accordance with at least one embodiment.

FIG. 3 is a diagram of an exemplary track drive motion. The track drive 12 includes a primary driven gear 18, an annular gear 20, a plurality (e.g., three) of intermediate gears 22, a frame 24, a plurality (e.g., three) of drive wheels 26 and a track 28.

In operation, the primary driven gear 18 is attached to the axle of a vehicle and is turned by the vehicle engine. For example, as shown in FIG. 3, the primary driven gear 18 rotates counter clockwise. The motion of the primary driven gear 18 causes the intermediate gears 22 to rotate clockwise and to cause the annular gear 20 to rotate clockwise. As the annular gear 20 rotates clockwise, the drive wheels 26 rotate counter clockwise and, in turn, cause the track 28 to move in a counter clockwise direction. The gears couple with straight teeth 30, for example.

As can be seen in FIG. 3, that the intermediate gears 22 are attached to respective midpoints of the triangular frame 24 and that the drive wheels 26 are attached at the corners of the triangular frame 24.

Figure 4A:
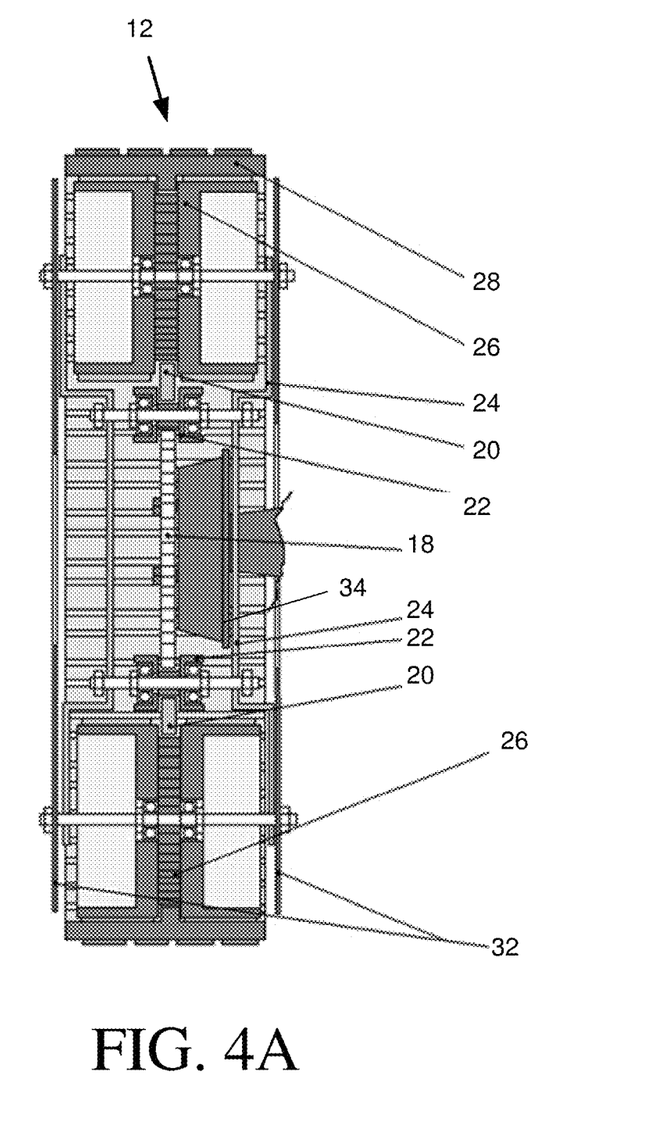
FIGS. 4A-C are diagrams of an exemplary track drive in accordance with at least one embodiment.

FIG. 4A shows a cut away diagram of an exemplary track drive 12. As can be seen in FIGS. 4A and 4C, track drive 12 includes the track tread 28, drive wheels 26, frame 24, annular gear 20, intermediate transfer gear 22 and the primary driven gear 18. Also shown are covers 32. As can be seen in FIG. 4A, the wheel hub 34 is bolted to the primary driven gear 18 and is disposed within the track drive 12.

As can be seen in FIG. 4C, covers 32 cover the outside and inside of the track drive 12. It will be appreciated that the inner cover may be in two or more pieces in order to accommodate the axle. These covers can help prevent debris from entering the track drive.

Figure 4B:
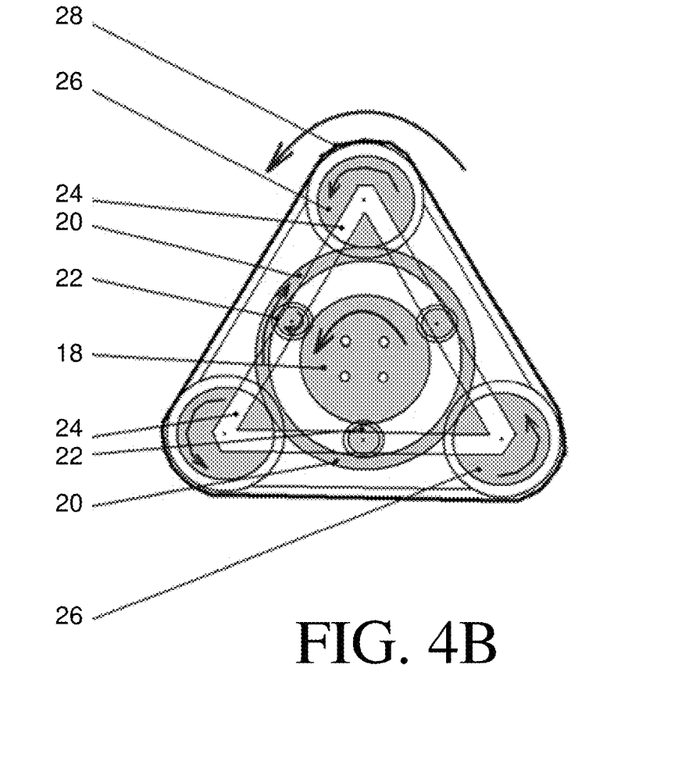
Figure 4C:
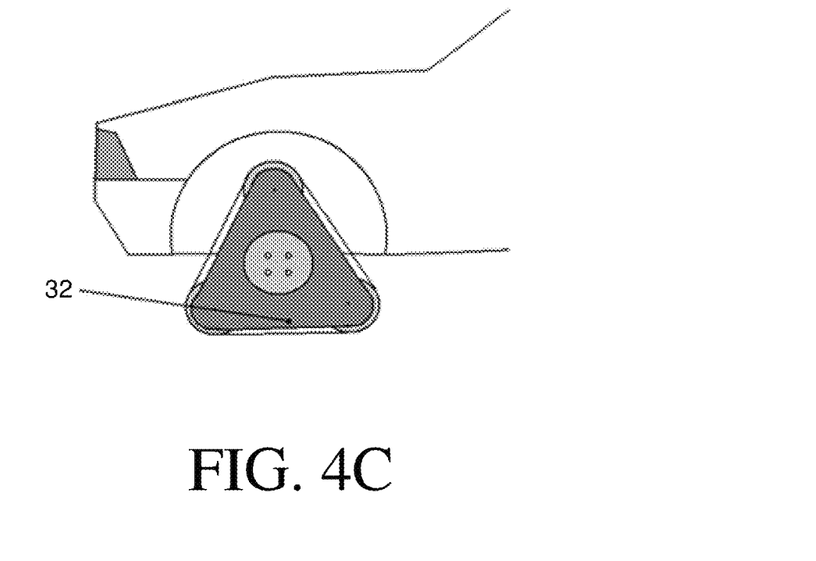

It will also be appreciated from FIG. 4 that the frame 24 can include two portions (e.g., an inner and outer frame portion).

Figure 5:
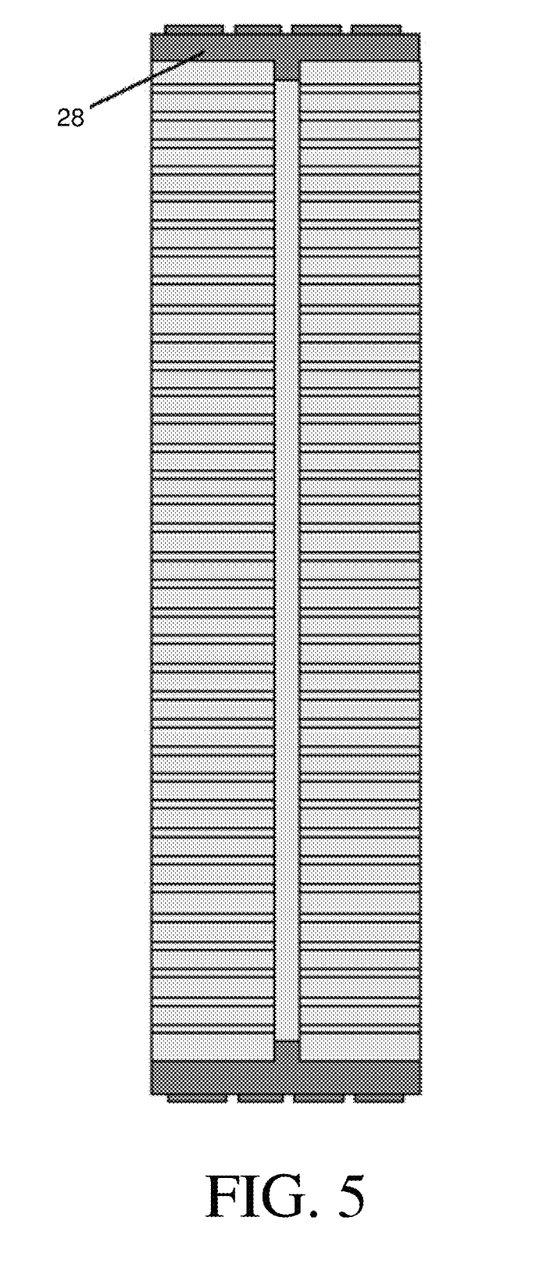
FIG. 5 is a diagram of an exemplary track drive tread in accordance with at least one embodiment.

FIG. 5 is a diagram of an exemplary track drive 12 showing the track tread 28 in greater detail.

Figure 6A:
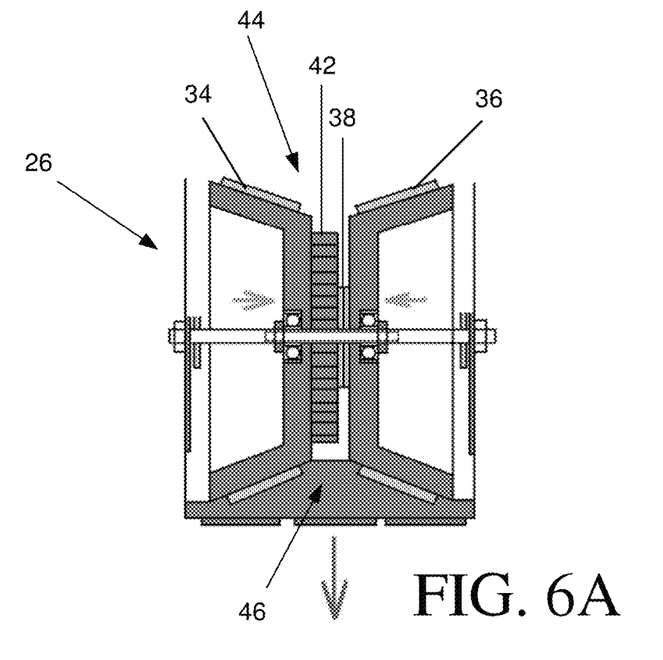
FIGS. 6A-B are cut away diagrams of exemplary track outer rollers for a track drive in accordance with at least one embodiment.
Figure 6B:
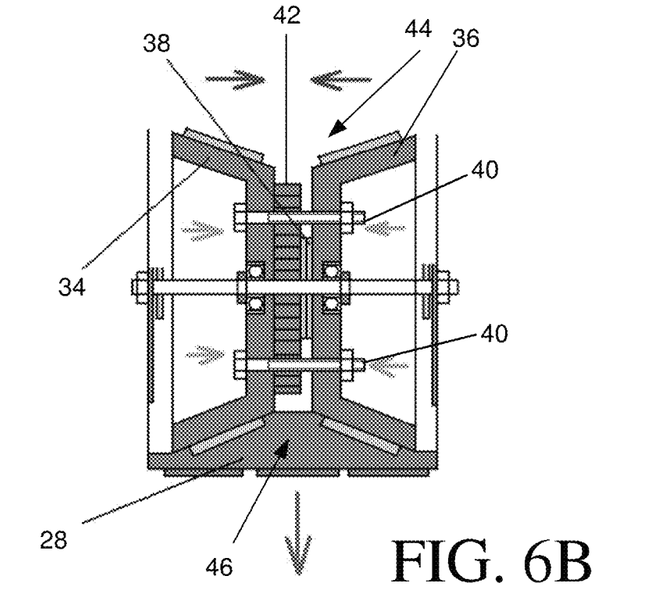

FIGS. 6A and 6B show cut away diagrams of exemplary drive wheels 26. The drive wheels 26 include a first portion 34 and a second portion 36. Washers 38 can be used to space the first portion and the second portion and to reduce backlash. Bolts 40 can be used to tighten the first portion and the second portion together, thereby tightening the track tread belt 28. The track drive apparatus can also include three track drive wheel assemblies 26, each having a first portion 34, a second portion 36 and an integrated gear 42 configured to mate with gear teeth on the outer circumference of the annular gear, the first portion 34 and the second portion 36 having beveled edges configured to form a substantially V-shaped drive section 44, the track drive wheel assemblies being connected to the frame. The track drive apparatus can include a continuous track configured to be driven by the track drive wheels, the continuous track can have a generally V-shaped inner surface 46 configured to mate with the generally V-shaped drive wheels 34 and 36.

All metallic components (e.g., gears, pulleys and frame) can be made of steel, cast aluminum, or other suitable material. The protective panels (see below) can be made from plastic (or from a thin sheet of metal). The bearings can be standard. The tread (or caterpillar) can be made of resin-fabric, resin-metal, rubber or fiber-reinforced rubber.

It is, therefore, apparent that there is provided, in accordance with the various embodiments disclosed herein, a rotatable track drive.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A track drive comprising:
    a primary driven gear configured to attach to a vehicle hub plate;
    an annular gear having gear teeth on in inner circumference and an outer circumference;
    a plurality of intermediate gears disposed between the primary driven gear and the inner circumference of the annular gear;
    a plurality of track drive wheels having an integrated gear configured to mate with gear teeth on the outer circumference of the annular gear; and
    a continuous track configured to be driven by the plurality of track drive wheels.

2. The track drive of claim 1, wherein the plurality of intermediate gears includes three intermediate gears.

3. The track drive of claim 2, wherein the plurality of track drive wheels includes three track drive wheels.

4. The track drive of claim 3, further comprising a frame.

5. The track drive of claim 4, wherein the frame is generally triangular.

6. The track drive of claim 5, wherein the plurality of intermediate gears are attached to the frame.

7. The track drive of claim 6, wherein the plurality of track drive wheels are attached to the frame.

8. The track drive of claim 7, wherein the plurality of track drive wheels each include a first portion and a second portion, the first portion and the second portion having a beveled edge so as to produced a generally V-shaped drive wheel.

9. The track drive of claim 8, wherein the continuous track includes a V-shaped interior surface configured to mate with the V-shaped drive wheel.

10. The track drive of claim 9, wherein the first portion and the second portion of the drive wheel can be adjusted closer together so as to tighten the continuous track.

11. A track drive vehicle comprising:
    a plurality of removable track drives, each track drive including
        a primary driven gear configured to attach to a vehicle hub plate;
        an annular gear having gear teeth on in inner circumference and an outer circumference;
        a plurality of intermediate gears disposed between the primary driven gear and the inner circumference of the annular gear;
        a plurality of track drive wheel assemblies, each having a first portion, a second portion and an integrated gear configured to mate with gear teeth on the outer circumference of the annular gear, the first portion and the second portion having beveled edges configured to form a substantially V-shaped drive section; and
        a continuous track configured to be driven by the plurality of track drive wheels, the continuous track having a generally V-shaped inner surface configured to mate with the generally V-shaped drive wheels.

12. The track drive vehicle of claim 11, wherein the plurality of intermediate gears includes three intermediate gears.

13. The track drive vehicle of claim 12, wherein the plurality of track drive wheels includes three track drive wheels.

14. The track drive vehicle of claim 13, further comprising a frame.

15. The track drive vehicle of claim 14, wherein the frame is generally triangular.

16. The track drive vehicle of claim 15, wherein the plurality of intermediate gears are attached to the frame.

17. The track drive vehicle of claim 16, wherein the plurality of track drive wheels are attached to the frame.

18. The track drive vehicle of claim 11, wherein the first portion and the second portion of each drive wheel can be adjusted closer together so as to tighten the continuous track.

19. A removable track drive apparatus comprising:
- a primary driven gear configured to attach to a vehicle hub plate;
- an annular gear having gear teeth on in inner circumference and an outer circumference;
- a triangular frame;
- three intermediate gears disposed between the primary driven gear and the inner circumference of the annular gear and being connected to the frame;
- three track drive wheel assemblies, each having a first portion, a second portion and an integrated gear configured to mate with gear teeth on the outer circumference of the annular gear, the first portion and the second portion having beveled edges configured to form a substantially V-shaped drive section, the track drive wheel assemblies being connected to the frame; and
- a continuous track configured to be driven by the track drive wheels, the continuous track having a generally V-shaped inner surface configured to mate with the generally V-shaped drive wheels.

20. The track drive apparatus of claim 19, wherein the first portion and the second portion of each drive wheel can be adjusted closer together so as to tighten the continuous track.

* * * * *